United States Patent
Mini et al.

(10) Patent No.: US 10,455,510 B2
(45) Date of Patent: Oct. 22, 2019

(54) INTERFACE DEVICE PROVIDING POWER MANAGEMENT AND LOAD TERMINATION IN DISTRIBUTED ANTENNA SYSTEM

(71) Applicant: Andrew Wireless Systems GmbH, Buchdorf (DE)

(72) Inventors: Massimiliano Mini, Forli (IT); Stefan Eisenwinter, Buchdorf (DE); Samuele Brighenti, Faenza (IT); Enrico Maria Fabbri, Forli (IT)

(73) Assignee: Andrew Wireless Systems GmbH, Buchdorf (DE)

( * ) Notice: Subject to any disclaimer, the term of this patent is extended or adjusted under 35 U.S.C. 154(b) by 104 days.

(21) Appl. No.: 15/858,890

(22) Filed: Dec. 29, 2017

(65) Prior Publication Data

US 2018/0124706 A1    May 3, 2018

Related U.S. Application Data

(63) Continuation of application No. 14/505,954, filed on Oct. 3, 2014, now Pat. No. 9,860,845.
(Continued)

(51) Int. Cl.
*H04W 52/02* (2009.01)
*H04B 7/024* (2017.01)
(Continued)

(52) U.S. Cl.
CPC ...... *H04W 52/0258* (2013.01); *H04B 1/0458* (2013.01); *H04B 7/024* (2013.01);
(Continued)

(58) Field of Classification Search
None
See application file for complete search history.

(56) References Cited

U.S. PATENT DOCUMENTS

| 5,950,111 A | 9/1999 | Georger et al. |
| 6,757,267 B1 | 6/2004 | Evans et al. |
(Continued)

FOREIGN PATENT DOCUMENTS

| EP | 2378662 A1 | 10/2011 |
| WO | 2011156465 A1 | 12/2011 |

OTHER PUBLICATIONS

European Patent Office, "Extended European Search Report from EP Application No. 18213870.1 dated Apr. 2, 2019", from Foreign Counterpart to U.S. Appl. No. 14/505,954, filed Apr. 2, 2019, pp. 1-10, Published: EP.
(Continued)

*Primary Examiner* — Chi H Pham
*Assistant Examiner* — Vladislav Y Agureyev
(74) *Attorney, Agent, or Firm* — Fogg & Powers LLC

(57) ABSTRACT

Certain aspects involve an interface device for a distributed antenna system ("DAS"). In some aspects, the interface device can include an interface, a power detector, and a processor. The interface can include one or more ports for communicatively coupling the interface device to a base station and a switch that is switchable between first and second configurations. The first configuration connects a port to a downlink path of the DAS, and the second configuration connects the port to a signal reflection path. The processor can switch the switch between the first and second configurations based on a signal power measured by the power detector at the port. In other aspects, the interface device can include additional ports and termination loads. The processor can cause a signal path to be connected to a termination load instead of a port based on the port being disconnected from a unit of the DAS.

20 Claims, 10 Drawing Sheets

Related U.S. Application Data

(60) Provisional application No. 61/886,897, filed on Oct. 4, 2013, provisional application No. 61/886,468, filed on Oct. 3, 2013.

(51) Int. Cl.
*H04W 24/10* (2009.01)
*H04B 7/06* (2006.01)
*H04B 1/04* (2006.01)

(52) U.S. Cl.
CPC ......... *H04B 7/0691* (2013.01); *H04B 7/0693* (2013.01); *H04W 24/10* (2013.01); *Y02D 70/00* (2018.01); *Y02D 70/40* (2018.01); *Y02D 70/442* (2018.01); *Y02D 70/444* (2018.01)

(56) References Cited

U.S. PATENT DOCUMENTS

| | | |
|---|---|---|
| 7,239,886 B2 | 7/2007 | Gross et al. |
| 7,386,306 B2 | 6/2008 | Laroia et al. |
| 7,471,935 B2 | 12/2008 | Barak et al. |
| 7,869,828 B2 | 1/2011 | Wang et al. |
| 7,961,689 B2 | 6/2011 | Stratford |
| 8,126,510 B1 | 2/2012 | Samson et al. |
| 8,145,127 B2 | 3/2012 | Nory et al. |
| 2003/0114165 A1 | 6/2003 | Mills |
| 2006/0099912 A1 | 5/2006 | Binzel et al. |
| 2007/0030609 A1 | 2/2007 | Reynolds |
| 2007/0232241 A1 | 10/2007 | Carley et al. |
| 2008/0111748 A1 | 5/2008 | Dunn et al. |
| 2008/0300021 A1 | 12/2008 | Knudsen et al. |
| 2009/0202020 A1 | 8/2009 | Hafeez |
| 2010/0304773 A1 | 12/2010 | Ramprashad |
| 2011/0135308 A1 | 6/2011 | Tarlazzi et al. |
| 2011/0156834 A1 | 6/2011 | Bellantoni |
| 2011/0201269 A1 | 8/2011 | Hobbs et al. |
| 2011/0201368 A1 | 8/2011 | Faccin et al. |
| 2011/0285603 A1 | 11/2011 | Skarp |
| 2012/0229229 A1 | 9/2012 | Franzon et al. |
| 2012/0320955 A1 | 12/2012 | Ueda et al. |
| 2013/0017863 A1 | 1/2013 | Kummetz et al. |
| 2013/0071112 A1 | 3/2013 | Melester et al. |
| 2013/0210478 A1 | 8/2013 | Sakata et al. |
| 2013/0260705 A1 | 10/2013 | Stratford |
| 2013/0260706 A1 | 10/2013 | Singh |
| 2013/0337750 A1 | 12/2013 | Ko |
| 2014/0022914 A1 | 1/2014 | Leimeister et al. |
| 2014/0168030 A1 | 6/2014 | Kim et al. |

OTHER PUBLICATIONS

Andrew Solutions, "ION-M Series, Optimized Multi-Band Multi-Operator Cost-Effective Solutions", Feb. 2013, pp. 1-8, Publisher: Commscope.
Commscope, "i-POI: Intelligent Point of Interface", Apr. 2012, pp. 1-8, Publisher: Commscope.
International Search Authority, "International Preliminary Report on Patentability for PCT Application No. PCT/IB2014/065047", "from Foreign Counterpart to U.S. Appl. No. 14/505,954", dated Apr. 14, 2016, pp. 1-12, Published in: WO.
International Search Authority, "International Search Report for PCT Application No. PCT/IB2014/065047", "Foreign Counterpart to U.S. Appl. No. 15/858,890", dated Apr. 8, 2015, pp. 1-5, Published in: WO.
U.S. Patent and Trademark Office, "Notice of Allowance for U.S. Appl. No. 14/505,954", dated Apr. 21, 2017, pp. 1-12, Published in: US.
U.S. Patent and Trademark Office, "Notice of Allowance for U.S. Appl. No. 14/505,954", dated Aug. 23, 2017, pp. 1-16, Published in: US.
U.S. Patent and Trademark Office, "Office Action for U.S. Appl. No. 14/505,954", dated Oct. 14, 2016, pp. 1-35, Published in: US.
U.S. Patent and Trademark Office, "Office Action for U.S. Appl. No. 14/505,954", dated Apr. 29, 2016, pp. 1-32, Published in: US.
European Patent Office, "EPO Communication under Rule 71(3) from EP Application No. 14789627.8 dated Jun. 28, 2018", "from Foreign Counterpart of U.S. Appl. No. 14/505,954", dated Jun. 28, 2018, pp. 1-54, Published in: EP.

INTERFACE DEVICE PROVIDING POWER MANAGEMENT AND LOAD TERMINATION IN DISTRIBUTED ANTENNA SYSTEM

CROSS-REFERENCE TO RELATED APPLICATIONS

This application is a continuation of U.S. patent application Ser. No. 14/505,954, filed Oct. 3, 2014, and titled "Interface Device Providing Power Management and Load Termination in Distributed Antenna System," which claims priority to U.S. Provisional Application Ser. No. 61/886,468, filed Oct. 3, 2013, and titled "Power Detection, Hybrid Configuration, and Automatic Load Termination for Intelligent Point of Interface System," and U.S. Provisional Application Ser. No. 61/886,897, filed Oct. 4, 2013, and titled "Power Detection, Hybrid Configuration, and Automatic Load Termination for Intelligent Point of Interface System," the contents of all of which are hereby incorporated by reference.

TECHNICAL FIELD

The present disclosure relates generally to telecommunication systems and more particularly (although not necessarily exclusively) to power management, load termination, and other features of an interface device for a distributed antenna system.

BACKGROUND

A distributed antenna system ("DAS") can include one or more master units or other head-end units and multiple remote units coupled to each master unit. A DAS can be used to extend wireless coverage in an area. Master units can be communicatively coupled to base stations. A master unit can receive downlink signals from the base station and distribute downlink signals in an analog or digital format to a radio frequency distribution system, which can include one or more remote units. The remote units can transmit the downlink signals to user equipment devices within coverage areas serviced by the remote units. In the uplink direction, signals from user equipment devices may be received by the remote units. The remote units can transmit the uplink signals received from user equipment devices to the master unit. The master unit can transmit uplink signals to the serving base stations.

An interface device for a DAS can be included in or communicatively coupled to one or more master units. The DAS interface device can communicate signals with one or more base stations that may be operated by one or more telecommunication providers. The DAS interface device can provide multiple independent paths for communicating non-duplexed signals received from multiple base stations. The signals communicated by the DAS interface device can utilize different channels, telecommunication standards, or operators.

Using a DAS interface device to communicate with multiple base stations can present challenges. In one example, a base station may transmit signals having a signal power that exceeds the capabilities of one or more components of the DAS. In another example, a DAS may communicate signals from some telecommunications providers that utilize multiple-input and multiple-output ("MIMO") communications and other telecommunications providers that do not utilize MIMO.

SUMMARY

According to one aspect, an interface device for a distributed antenna system is provided. The interface device can include an interface, a power detector, and a processing device communicatively coupled to the power detector. The interface can include one or more ports for communicatively coupling the interface device to one or more base stations. The interface can also include a switch that is coupled to at least one of the ports and that can be switched from a first configuration to a second configuration. The first configuration connects the port to a downlink path from the interface device to a unit of the distributed antenna system and the second configuration connects the port to a signal reflection path. The power detector can measure a signal power of an input signal at the port. The processing device can determine that the measured signal power of the input signal exceeds a threshold signal power and switch the switch from the first configuration to the second configuration in response to determining that the measured signal power exceeds the threshold signal power.

According to another aspect, an interface device for a distributed antenna system is provided. The interface device can include multiple signal paths with respective switches, multiple ports that can be connected to respective units of the distributed antenna system, termination loads, and a processing device. Each switch can be switched from a first configuration to a second configuration. The first configuration connects a signal path to one of the ports. The second configuration connects the signal path to one of the termination loads. The processing device can determine that one of the ports is not connected to a unit of the distributed antenna system. The processing device can respond to determining that the port is not connected to a unit by disconnecting one of the signal paths from the port and connecting the signal path to one of the termination loads. The disconnection from the port and connection to termination load can involve switching a switch in the signal path from the first configuration to the second configuration.

These illustrative aspects and features are mentioned not to limit or define the disclosure, but to provide examples to aid understanding of the concepts disclosed in this application. Other aspects, advantages, and features of the present disclosure will become apparent after review of the entire application.

DETAILED DESCRIPTION

Figure 1:
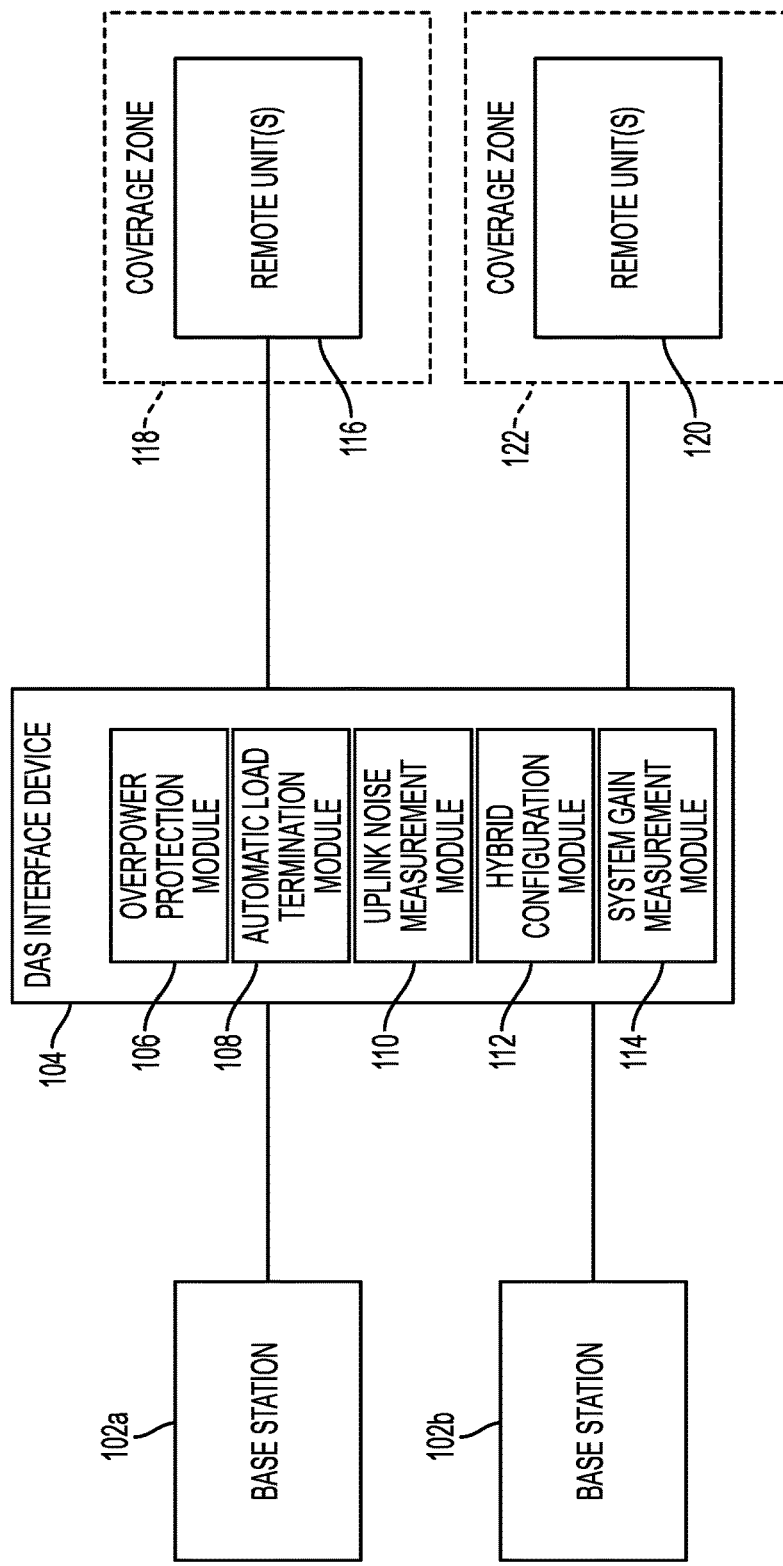
FIG. 1 is a block diagram depicting an example of an interface device that can be communicatively coupled to one or more base stations and that can be communicatively coupled to or included in one or more distributed antenna systems according to one aspect of the present disclosure.

Certain aspects and features relate to improved power management, load termination, and other features in an interface device of a distributed antenna system ("DAS"). An interface device of a DAS can be a plug-in module or other device that is used for managing a DAS.

The interface device can provide power management by, for example, protecting one or more components in a downlink path from overpowering. For example, the interface device can include a power detector connected to a port that communicatively couples the interface device to one or more base stations. The power detector can measure a signal power of an input signal at the port. The interface device can also include a processing device that can determine if the measured signal power of the input signal exceeds a threshold signal power. The processing device can disconnect the port from the downlink path and connect the port to a signal reflection path based on determining that the measured signal power of the input signal exceeds a threshold signal power. One non-limiting example of a signal reflection path is an open circuit. The open circuit can cause at least a portion of the input signal to be reflected to a base station. Another non-limiting example of a signal reflection path is a signal path having a load with impedance sufficient to reflect at least a portion of the input signal. The base station can reduce a transmission power for subsequent downlink signals based on receiving the reflected signal. The processing device can determine that another downlink signal from the base station has a signal power that is less than or equal to the threshold signal power. The processing device can disconnect the port from the signal reflection path and connect the port to the downlink path based on determining that the measured signal power of the input signal is less than or equal to the threshold signal power.

In additional or alternative aspects, the interface device can facilitate power management by measuring a gain associated with the interface device. For example, the interface device can include a first power detector coupled to an input port and a second power detector coupled to an output port. In some aspects, an input port can communicatively couple the interface device to a base station for receiving downlink signals, and an output port can communicatively couple the interface device to a unit of the DAS (e.g., a master unit, a remote unit, etc.) for providing downlink signals to the unit. In other aspects, an input port can communicatively couple the interface device to a unit of the DAS for receiving uplink signals, and an output port can communicatively couple the interface device to a base station for providing uplink signals to the base station. The first power detector can measure a signal power of an input signal received via the input port. The second power detector can measure a signal power of an output signal generated from the input signal and outputted via the output port. A processing device can be communicatively coupled to the first and second power detectors. The processing device can correlate the input signal and the output signal. The processing device can determine a gain associated with the interface device based on the measured signal powers of the input signal of the output signal. In some aspects, one or more of the power detectors can also be used to measure or otherwise determine an uplink noise associated with the DAS.

In additional or alternative aspects, the interface device can provide automatic load termination for signal paths of the interface device. The signal paths can include switches that are used to connect respective signal paths to ports of the interface device or termination loads. For example, a processing device of the interface device can determine that one of the ports is not connected to a unit of the distributed antenna system. The processing device can respond to this determination by configuring a switch to disconnect a signal path from the port and to connect the signal path to one of the termination loads. In some aspects, the processing device can use a configuration plan for the DAS to determine that the port is not connected to a unit. For example, the configuration plan may specify that a subset of the ports are used or will be used for connecting the interface device to units of the DAS. The processing device can determine that a given port is not connected to a unit based on the port not being included in the specified subset of ports for connecting the interface device to units of the DAS. In additional or alternative aspects, the interface device can include a signal generator that is communicatively coupled to the signal paths and that can provide one or more test signals to one or more of the signal paths. The processing device can determine that a port is not connected to a unit based on a signal power associated with the test signal (e.g., the signal power of a reflected signal generated from the test signal by the port being in a disconnected state).

Detailed descriptions of certain examples are discussed below. These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure. The various figures described below depict examples of implementations for the present disclosure, but should not be used to limit the present disclosure.

FIG. 1 is a block diagram depicting an example of a DAS interface device 104 that can be communicatively coupled to one or more base stations 102*a*, 102*b* and that can be communicatively coupled to or included in one or more DAS's.

A DAS can communicate signals between one or more base stations 102*a*, 102*b* and terminal devices via the DAS interface device 104 and remote units 116, 120 servicing coverage zones 118, 122. The remote units 116, 120 can include remote antenna units or other devices that can include or be communicatively coupled to one or more antennas. Remote units 116, 120 can be configured to wirelessly communicate signals with terminal devices (i.e., electronic devices used to communicate voice and/or data via a telecommunications system).

The DAS interface device 104 can receive downlink signals from the base stations 102*a*, 102*b* and transmit uplink signals to the base stations 102*a*, 102*b*. Any suitable communication link can be used for communication between the base stations 102*a*, 102*b* and a DAS interface device 104. A suitable communication link can be a wired connection or a wireless connection. A wired connection can include, for example, a connection via a copper cable, an optical fiber, or another suitable communication medium. A wireless connection can include, for example, a wireless RF communication link. In some aspects, the DAS interface device 104 can combine downlink signals received from base stations 102*a*, 102*b*. The DAS interface device 104 can transmit the combined downlink signals to one or more of the remote units 116, 120.

The remote units 116, 120 can provide signal coverage in respective coverage zones 118, 122. Providing signal coverage in the coverage zones 118, 122 can include transmitting downlink signals received from the DAS interface device 104 to terminal devices in the coverage zones 118, 122. Providing signal coverage in the coverage zones 118, 122 can also include receiving uplink signals from the mobile communication devices or other terminal devices in the coverage zones 118, 122. The remote units 116, 120 can transmit the uplink signals to the DAS interface device 104.

In some aspects, the DAS interface device 104 can be included in a master unit or other suitable unit that can communicate with one or more base stations 102*a*, 102*b*. A master unit can include, for example, an optical transceiver that transmits optical signals to remote units in a DAS. The master unit or other suitable unit can communicate with remote units 116, 120 in different coverage zones 118, 122 of the same DAS. In additional or alternative aspects, the DAS interface device 104 can be included in a base station router or other suitable unit that can communicate signals between one or more base stations 102*a*, 102*b* and one or more master units. In some aspects, the master units in communication with the DAS interface device 104 can be used to communicate with remote units 116, 120 in different coverage zones 118, 122 of the same DAS. In other aspects, a first master unit in communication with the DAS interface device 104 can be used to communicate with remote units 116 in a coverage zone 118 of a first DAS and a second master unit in communication with the DAS interface device 104 can be used to communicate with remote units 116 in a coverage zone 118 of a first DAS.

Although FIG. 1 depicts a direct connection between the DAS interface device 104 and the remote units 116, 120, other implementations are possible. In some aspects, the DAS interface device 104 can be connected to the remote units 116, 120 via one or more extension units or other intermediate devices.

The DAS interface device 104 can include an overpower protection module 106, an automatic load termination module 108, an uplink noise measurement module 110, a hybrid configuration module 112, and a system gain measurement module 114. In some aspects, suitable hardware components can be used to implement one or more of the overpower protection module 106, the automatic load termination module 108, the uplink noise measurement module 110, the hybrid configuration module 112, and the system gain measurement module 114. In other aspects, suitable programming instructions executed by one or more processing devices can be used to implement one or more of the overpower protection module 106, the automatic load termination module 108, the uplink noise measurement module 110, the hybrid configuration module 112, and the system gain measurement module 114. In other aspects, a combination of suitable hardware components and suitable programming instructions executed by one or more processing devices can be used to implement one or more of the overpower protection module 106, the automatic load termination module 108, the uplink noise measurement module 110, the hybrid configuration module 112, and the system gain measurement module 114.

The overpower protection module 106 can provide overpower protection for one or more of the DAS interface device 104 and a DAS that is communicatively coupled to the DAS interface device 104. For example, a DAS interface device 104 may be specified for mid-range power base stations and have a maximum input power level of 4 watts. The components inside the DAS interface device 104 may not work properly for an input power level exceeding the specified input power. The overpower protection module 106 can prevent power that exceeds 4 watts or some other threshold power from being provided to other components of the DAS interface device 104. In some aspects, a threshold power can be defined, specified, selected, or otherwise provided by a user. For example, a microprocessor of the overpower protection module 106 or a computing device that is communicatively coupled to the microprocessor can identify a downlink signal power used by on one or more of the base stations 102*a*, 102*b*. The downlink signal power can be provided to the user via an interface that is generated by the microprocessor of the overpower protection module 106 or a computing device that is communicatively coupled to the microprocessor. The user can use the interface to define, specify, select, or otherwise provide a threshold power to the microprocessor. In additional or alternative aspects, the threshold power can be determined automatically by a microprocessor of the overpower protection module 106 using a pilot decoding procedure.

The automatic load termination module 108 can be used to automatically terminate unused downlink ports to one or more suitable resistive termination loads. An example of a suitable resistive termination load is a load having a resistance of 50 ohms. Automatically terminating unused uplink and downlink ports can reduce errors during installations and reduce costs associated with external loads.

The uplink noise measurement module 110 can measure uplink noise at the output of a DAS to which the DAS interface device 104 is communicatively coupled or in which the DAS interface device 104 is included. The uplink noise measurement can be used to define, specify, or otherwise configure one or more gain settings of the DAS. For example, uplink gain settings can be configured to be the same as a downlink gain setting or can be optimized for a noise level at base station that is communicatively coupled to the DAS. For cases in which the one or more uplink gain settings are optimized for a noise level at base station that is communicatively coupled to the DAS, the noise at the base station can be measured or otherwise obtained. A user of the DAS can define, specify, or otherwise provide a given noise rise of the base station. The uplink noise measurement module 110 can be used to determine the uplink noise of the DAS. The uplink noise measurement can be used to adjust one or more gain settings of the DAS to obtain the given noise rise of the base station. For example, one or more attenuators in an uplink path can be configured such that the uplink noise corresponds to a desired noise rise for a base station.

The hybrid configuration module 112 can allow the DAS interface device 104 to operate in a hybrid configuration for providing combined signals to multiple coverage zones 118, 122 or providing MIMO capability to one or more of the coverage zones 118, 122. In a configuration used for providing combined signals, the hybrid configuration module 112 can combine downlink signals from multiple base stations 102a, 102b. The combined downlink signals can be provided to multiple coverage zones 118, 122 serviced by one or more DAS's. In an uplink direction, the hybrid configuration module 112 can combine or split uplink signals and provide the uplink signals to one or more of the base stations 102a, 102b. In a configuration used for providing MIMO capability, downlink signals can be split or otherwise separated for MIMO transmission by multiple remote units in one or more of the coverage zones 118, 122.

The system gain measurement module 114 can measure the gain for signals from different telecommunication providers that use one or more DAS's communicatively coupled to the DAS interface device 104. Measuring system gain can allow for tracking a malfunction in the DAS interface device 104. Measuring system gain can allow an alarm to be generated for system monitoring and simplifying troubleshooting. In some aspects, the system gain measurement can be used to simplify troubleshooting and reduce the costs associated with using other components to monitor the performances of the module or overall system. In some aspects, the system gain measurement can be performed for the DAS interface device 104 (e.g., from an input of the DAS interface device 104 to an output of the DAS interface device 104). In other aspects, the system gain measurement can be performed for the DAS (e.g., in a downlink direction from an input of the DAS interface device 104 to an output of a remote unit and/or in an uplink direction from an input of a remote unit to an output of the DAS interface device 104). Issues with respect to system gain can be determined based on gain measurements at different measurement points in the DAS interface device 104.

For illustrative purposes FIG. 1 depicts the DAS interface device 104 as including an overpower protection module 106, an automatic load termination module 108, an uplink noise measurement module 110, a hybrid configuration module 112, and a system gain measurement module 114. However, other implementations are possible. For example, a DAS interface device 104 can omit one or more of the overpower protection module 106, the automatic load termination module 108, the uplink noise measurement module 110, the hybrid configuration module 112, and the system gain measurement module 114.

Figure 2:
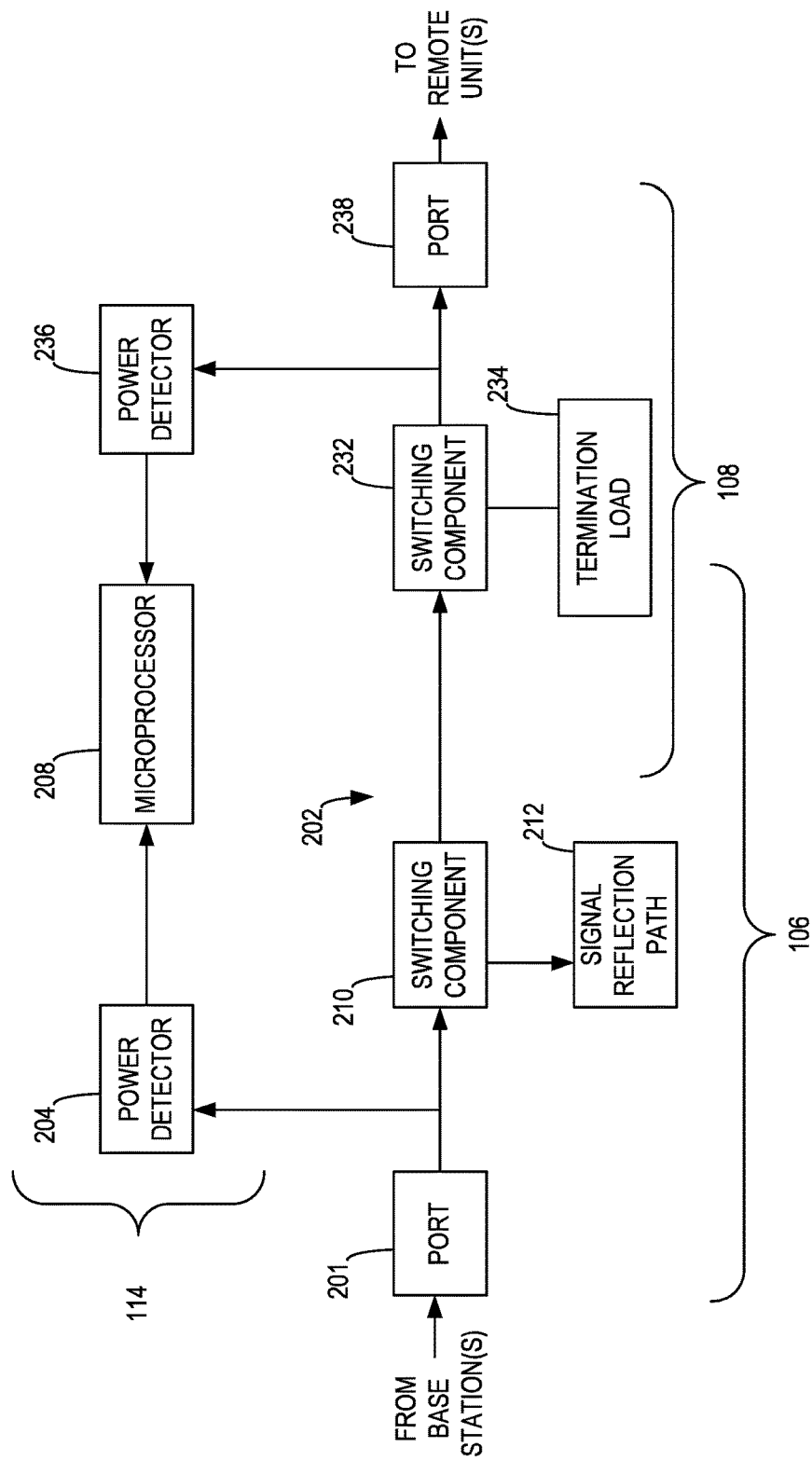
FIG. 2 is a block diagram that depicts examples of an overpower protection module, an automatic load termination module, and a system gain measurement module in a downlink path of a distributed antenna system according to one aspect of the present disclosure.

FIG. 2 is a block diagram that depicts examples of an overpower protection module 106, an automatic load termination module 108, and a system gain measurement module 114 in a downlink path 202. The downlink path 202 can be used to provide signals from a base station to one or more remote units of a DAS or other units of a DAS.

The downlink path includes a port 201, a switching component 210, a power detector 204, a microprocessor 208, a signal reflection path 212, a switching component 232, a termination load 234, a power detector 236, and a port 238.

The overpower protection module 106 can include one or more ports 201, one or more switching components 210, one or more power detectors 204, the microprocessor 208, and one or more signal reflection paths 212. The port 201 can communicatively couple the interface device 104 to a base station. The switching component 210 can be communicatively coupled to the port 201. The switching component 210 can be switched from a first configuration to a second configuration. The first configuration can connect or otherwise communicatively couple the port 201 to the downlink path. The second configuration can connect or otherwise communicatively couple the port 201 to a signal reflection path 212. The power detector 204 can be communicatively coupled to the port 201. For example, a directional coupler may be used to couple the power detector 204 to a signal path between the port 201 and the switching component 210. The power detector 204 can measure a signal power of an input signal at the port 201.

A microprocessor 208 can be communicatively coupled to the power detector 204. For example, an output of the power detector 204 can be electrically coupled to an analog-to-digital converter input of the microprocessor 208. The microprocessor 208 can determine that the measured signal power of the input signal received via the input port 201 exceeds a threshold signal power. The microprocessor 208 can switch or otherwise modify the configuration of the switching component 210 from the first configuration to the second configuration in response to determining that the measured signal power exceeds the threshold signal power.

The automatic load termination module 108 can include the microprocessor 208, one or more switching components 232, and one or more termination loads 234. One or more ports 238 can be connected to respective units of the DAS, such as (but not limited to) one or more remote units of the DAS. One or more downlink paths 202 can include respective switching components 232. Each switching component 232 can be switched or otherwise configured between a first configuration to a second configuration. The first configuration can connect or otherwise communicatively couple a downlink path 202 to a port 238. The second configuration can connect or otherwise communicatively couple the downlink path 202 to a termination load 234. The microprocessor 208 can be communicatively coupled to the downlink path 202. For example, the microprocessor 208 can be communicatively coupled to one or more switching components 232 via a printed circuit board or other suitable communication structure. The microprocessor 208 can determine that a port 238 is in a disconnected state. In the disconnected state, the port 238 may not be connected to any unit of the DAS. The microprocessor 208 can respond to determining that the port 238 is not connected to a unit by disconnecting one of the downlink paths 202 from the port 238 and connecting the downlink path 202 to one of the termination loads 234. The disconnection from the port 238 and the connection to the termination load 234 can involve switching or otherwise changing the configuration of a switching component 232 from the first configuration to the second configuration.

The system gain measurement module 114 can include one or more power detectors 204, 236 and the microprocessor 208. The system gain measurement module 114 can obtain a first power measurement using one or more power detectors 204 or one or more other power detectors at the input of the DAS interface device 104. The system gain measurement module 114 can obtain a second power measurement using one or more power detectors 236 or one or more other power detectors at the output of the DAS interface device 104. The microprocessor 208 can use the first and second measurements to determine the system gain.

An example of a power detector is an RF power detector, such as (but not limited to) a root-mean-square detector. In some aspects, a power detector can output a voltage or current indicative of a measured power. The output of the power detector can be coupled to an input of a microprocessor 208. An analog-to-digital converter of the microprocessor 208 can sample the outputted voltage or current from the power detector to obtain data indicative of a signal power measured by the power detector.

Each switching component can include at least two configurations for connecting different portions of a signal path. An example of a switching component is an electromechanical relay. An electromechanical relay can include an inductive coil and an arm that is movable between at least two contacts. Providing or ceasing a current to the inductive coil can generate a magnetic field that moves an arm of the switch from one contact (i.e. a first configuration) to another contact (i.e., a second configuration).

For illustrative purposes, the block diagram of FIG. 2 depicts a single downlink path 202 having a single port 201, a single switching component 210, a single power detector 204, a single microprocessor 208, a single signal reflection path 212, a single switching component 232, a single termination load 234, a single power detector 236, and a single port 238. However, other implementations are possible. For example, a DAS interface device 104 can include any number of downlink paths with one or more ports 201, one or more switching components 210, one or more power detectors 204, one or more power detectors 204, one or more microprocessors 208, one or more signal reflection paths 212, one or more switching components 232, one or more termination loads 234, one or more power detectors 236, and/or one or more ports 238.

The block diagram of FIG. 2 does not depict one or components in the downlink path through DAS interface device 104. However, in some implementations, additional devices or components can be included in the downlink path 202 between the components of the overpower protection module 106 and the components of the automatic load termination module 108. For example, one or more components of the hybrid configuration module 112 can be included in a downlink path, as depicted in FIG. 3.

Figure 3:
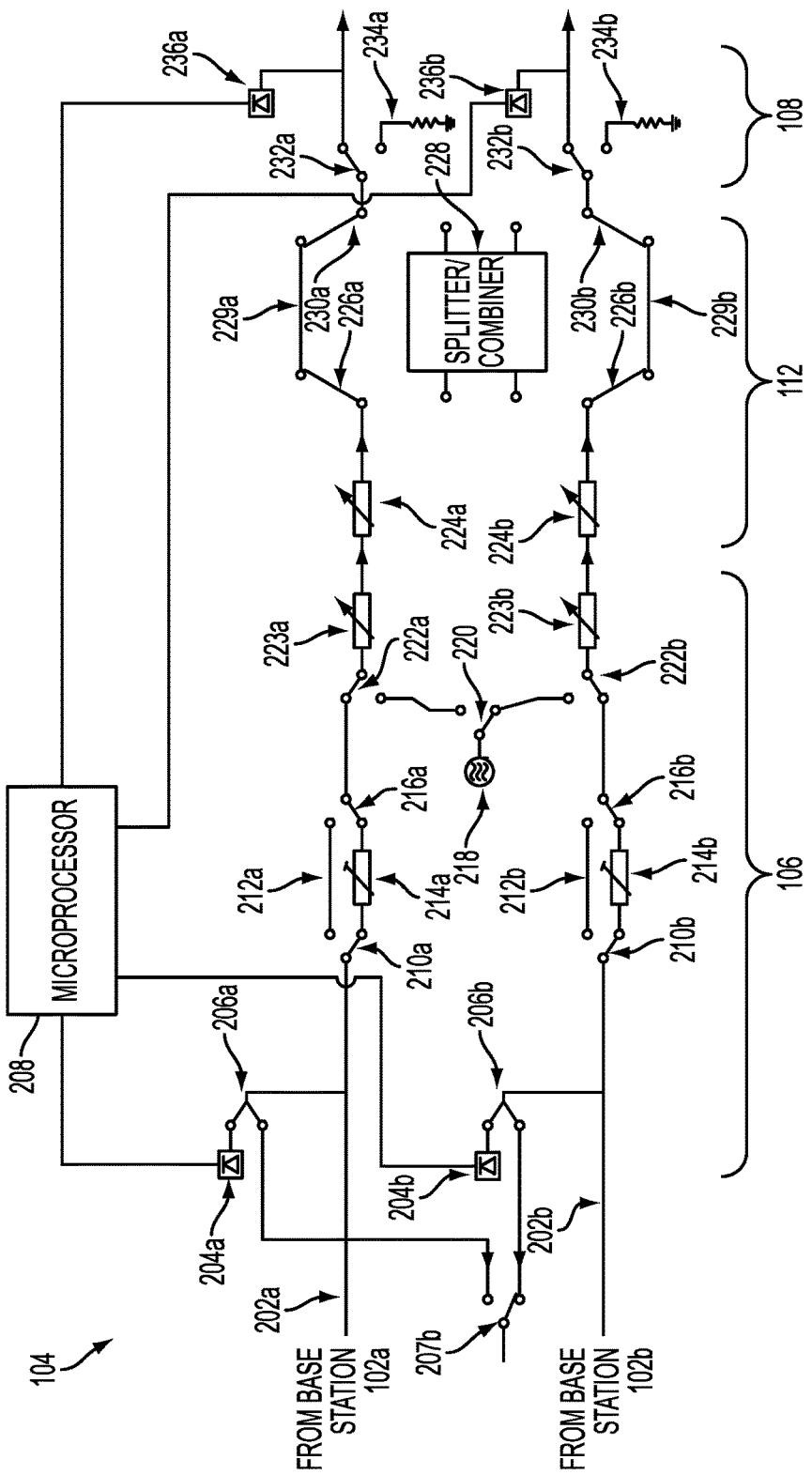
FIG. 3 is a schematic diagram that depicts an example of an implementation of an interface device having an overpower protection module, an automatic load termination module, and a portion of a hybrid configuration module in downlink paths of a distributed antenna system according to one aspect of the present disclosure.

FIG. 3 is a schematic diagram that depicts an example of an implementation of the DAS interface device 104 having the overpower protection module 106, the automatic load termination module 108, and at least a portion of the hybrid configuration module 112 in downlink paths 202a, 202b. The downlink path 202a can be used to provide signals from the base station 102a to one or more remote units of a DAS. The downlink path 202b can be used to provide signals from the base station 102b to one or more remote units of a DAS.

For the implementation depicted in FIG. 3, the overpower protection module 106 can include power detectors 204a, 204b, two-way couplers 206a, 206b, a microprocessor 208, switching components 210a, 210b, signal reflection paths 212a, 212b, attenuators 214a, 214b, switches 216a, 216b, and switches 222a, 222b. The switching components 210a, 210b can be coupled to the microprocessor 208 in any suitable manner (e.g., via conductive leads or traces of a printed circuit board). The operations of various components of the overpower protection module 106 are described in detail herein with respect to FIGS. 4 and 5.

The two-way couplers 206a, 206b can be used to couple the downlink paths 202a, 202b to a switch 207. The switch 207 can be used to selectively couple one of the downlink paths 202a, 202b to an external device, such as (but not limited to) a digital signal measurement receiver. In some aspects, the switch 207 can be controlled or otherwise configured using the microprocessor 208. The switch 207 can be coupled to the microprocessor 208 in any suitable manner (e.g., via conductive leads or traces of a printed circuit board).

In some aspects, the two-way couplers 206a, 206b and the switch 207 can be omitted. In these aspects, the power detectors 204a, 204b can be communicatively coupled to the respective downlink paths 202a, 202b via other suitable coupling devices.

For the implementation depicted in FIG. 3, at least a portion of the hybrid configuration module 112 is included in the downlink paths 202a, 202b. The portion of the hybrid configuration module 112 can include attenuators 224a, 224b, switches 226a, 226b, a splitter/combiner 228, bypass signal paths 229a, 229b, and switches 230a, 230b. In some aspects, one or more of the switches 226a, 226b, 230a, 230b can be coupled to the microprocessor 208 in any suitable manner (e.g., via conductive leads or traces of a printed circuit board). The operations of various components of the hybrid configuration module 112 are described in detail herein with respect to FIG. 8.

For the implementation depicted in FIG. 3, the automatic load termination module 108 in the downlink paths 202a, 202b can include the microprocessor 208, switches 232a, 232b, resistive termination loads 234a, 234b, and power detectors 236a, 236b. The switches 232a, 232b can be coupled to the microprocessor 208 in any suitable manner (e.g., via conductive leads or traces of a printed circuit board). The operations of various components of the hybrid configuration module 112 are described in detail herein with respect to FIG. 8.

FIG. 3 depicts a DAS interface device 104 having two downlink paths 202a, 202b for illustrative purposes. However, other implementations are possible. For example, a DAS interface device 104 can include any number of downlink paths with any number of devices or other components corresponding to the devices or other components depicted in FIG. 3 for downlink paths 202a, 202b.

One or more components depicted in FIG. 3 can also be used to implement other modules of the DAS interface device 104. For example, a system gain measurement module 114 can include the microprocessor 208 and one or more of the power detectors depicted in FIG. 3. Such a system gain measurement module 114 can include one or more of the power detectors 204a, 204b or one or more other power detectors at the input of the DAS interface device 104. The system gain measurement module 114 can also include one or more of the power detectors 236a, 236b or one or more other power detectors at the output of the DAS interface device 104.

The system gain measurement module 114 can obtain a first power measurement using one or more of the power detectors 204a, 204b or one or more other power detectors at the input of the DAS interface device 104. The system gain measurement module 114 can obtain a second power measurement using one or more of the power detectors 236a, 236b or one or more other power detectors at the output of the DAS interface device 104. The microprocessor 208 can use the first and second measurements to determine the system gain.

In some aspects, the microprocessor 208 can measure the system gain in the downlink direction. In additional or alternative aspects, the microprocessor 208 can measure the system gain in the uplink direction. To measure a system gain in the uplink or downlink direction, the microprocessor 208 can correlate or synchronize the input voltage signal (e.g., an input uplink or downlink signal) with the output voltage signal (e.g., an output uplink or downlink signal). For example, the microprocessor 208 can correlate the amplitude of the input signal voltage with the amplitude of the output signal voltage.

In some aspects, the system gain measurement module 114 can include an enhanced channel power detector. The enhanced channel power detector can detect downlink signals from different telecommunication providers that have been combined by the hybrid configuration module 112. The enhanced channel power detector can detect the downlink signals from the different telecommunication providers by selectively measuring power in the frequency domain.

Although FIG. 3 depicts various switches as relays, other implementations of a switching function are possible. For example, two transistors can connect a signal path to two other signal paths. A second configuration of a switching function can be implemented by applying a current or voltage to the base of a first one of the transistors and not applying a current or voltage to the base of a second one of the transistors at a first point in time. A second configuration of the switching function can be further implemented by applying a current or voltage to the base of the second transistor and not applying a current or voltage to the base of the first transistor at a second point in time.

Figure 4:
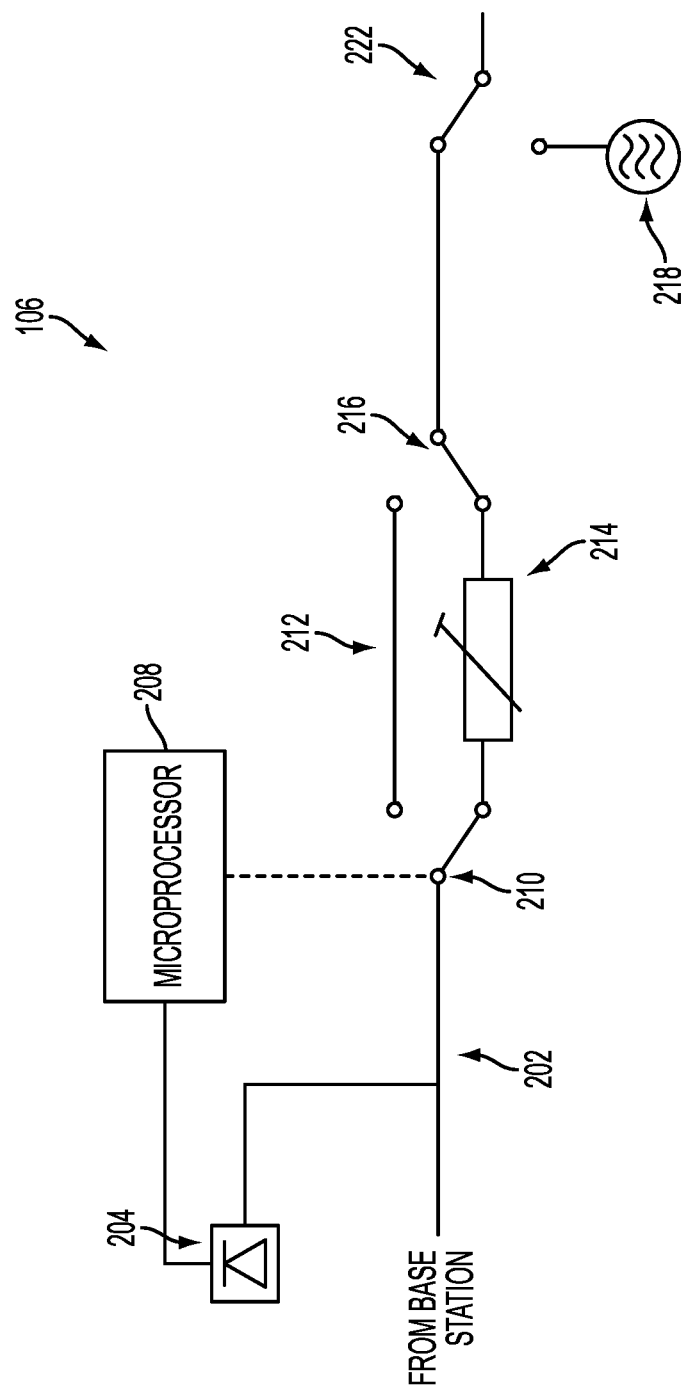
FIG. 4 is a schematic diagram that depicts an example of the overpower protection module of FIG. 3 under normal operating conditions according to one aspect of the present disclosure.
Figure 5:
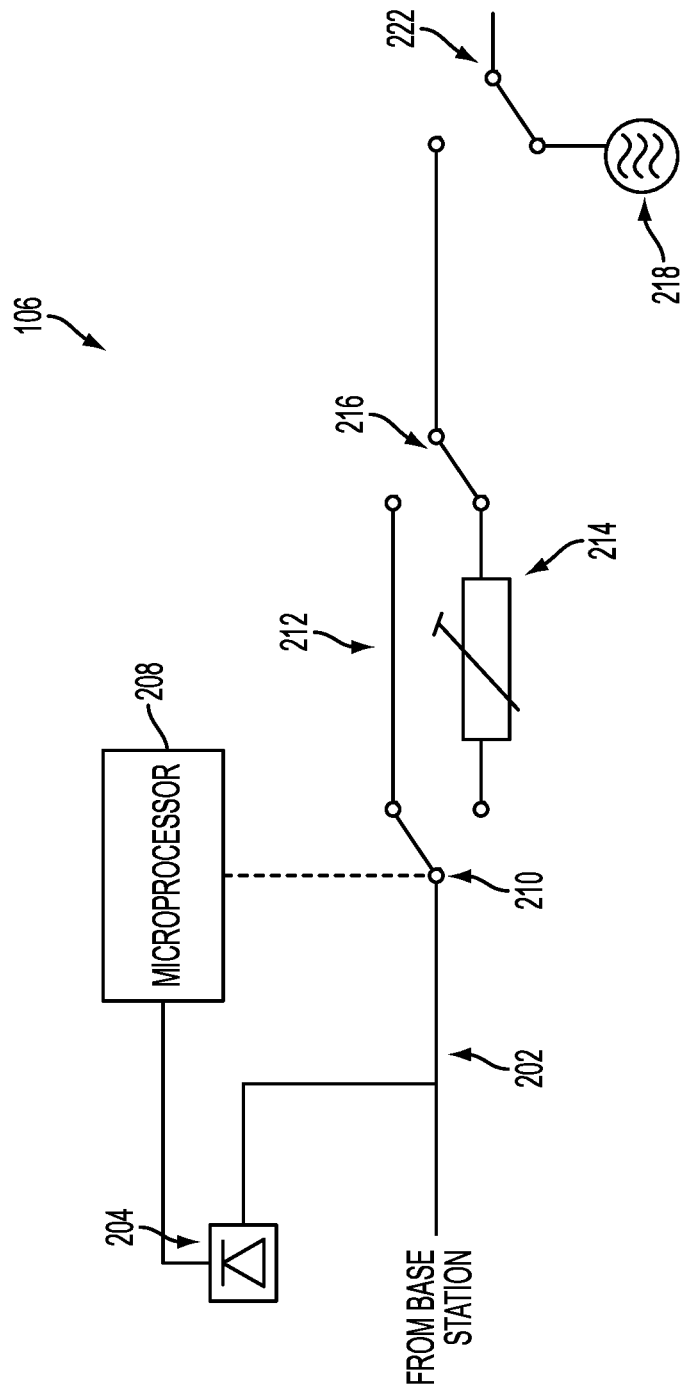
FIG. 5 is a schematic diagram that depicts an example of the overpower protection module of FIG. 3 during an overpower condition according to one aspect of the present disclosure.

FIGS. 4 and 5 are schematic diagrams that depict an example of an implementation the overpower protection module 106. The example of an overpower protection module 106 depicted in FIGS. 4 and 5 includes a power detector 204, the microprocessor 208, and switching components 210, 216. The power detector 204 can monitor the input power for signal received at one or more inputs of the DAS interface device 104. The power detector 204 can be connected to an input port of the DAS interface device via which a downlink signal is received.

FIG. 4 depicts the overpower protection module 106 under normal operating conditions. Under normal operating conditions, switching components 210, 216 connect a downlink path 202 to an attenuator 214. The attenuator 214 can attenuate downlink signals received from a base station. The attenuated signals can be routed through the DAS interface device 104.

FIG. 5 depicts the overpower protection module 106 during an overpower condition. In an overpower condition, one or more of the switching components 210, 216 can be actuated such that the downlink path 202 includes an open circuit. For example, an arm of the switching component 210 can be switched from the attenuator 214 to the signal reflection path 212.

The power detector 204 and the microprocessor 208 can be used to configure the downlink path in response to an overpower condition. The DAS interface device 104 can include an interface that includes ports for communicatively coupling the DAS interface device 104 to a base station or other signal source. The interface can also include a power detector 204 that is communicatively coupled to an input port of the DAS interface device 104. The power detector 204 can measure the power of a downlink signal received at an input port of the DAS interface device 104. The microprocessor 208 can receive a signal or data from the power detector 204 that identifies or otherwise indicates the measured power level of the downlink signal. The microprocessor 208 can compare the measured power level to a threshold power. The microprocessor 208 can determine that the measured power level exceeds the threshold power. The microprocessor 208 can configure the DAS interface device 104 to switch or otherwise change the configuration of the switching component 210 such that an input port of the DAS interface device 104 is connected to the signal reflection path 212. An input signal having a signal power in excess of the threshold power can be reflected by the signal reflection path 212 to one of the base stations 102*a*, 102*b* communicatively coupled to the DAS interface device 104. In some aspects, the signal reflection path 212 can include an open circuit, as depicted in FIG. 3. In other aspects, the signal reflection path 212 can include a component having an impedance sufficient to reflect at least some of the input signal.

In some aspects, the overpower protection module 106 can include a switch 222. The switch 222 can be used to open the downlink path 202. Using the switch 222 to open the downlink path 202 can provide additional isolation between the components of the DAS interface device 104 and the input port via which one or more downlink signals having excessive signal powers are received. In other aspects, the switch 222 can be omitted.

In some aspects, the switch 222 can be used to connect a downlink path of the DAS interface device 104 to a signal generator 218.

In some aspects, the power detector 204 can monitor the input signal power after the input port has been connected to the signal reflection path 212. In some aspects, the input signal power can be monitored continuously. In other aspects, the input signal power can be monitored at periodic intervals. The power detector 204 can output a signal or data indicative of the input signal power to the microprocessor 208. The microprocessor 208 can determine that the signal power of one or more input signals is less than the threshold power level. The microprocessor 208 can respond to this determination by configuring one or more of the switching components 210, 216, 222 to connect the downlink path to the input port of the DAS interface device 104.

Figure 6:
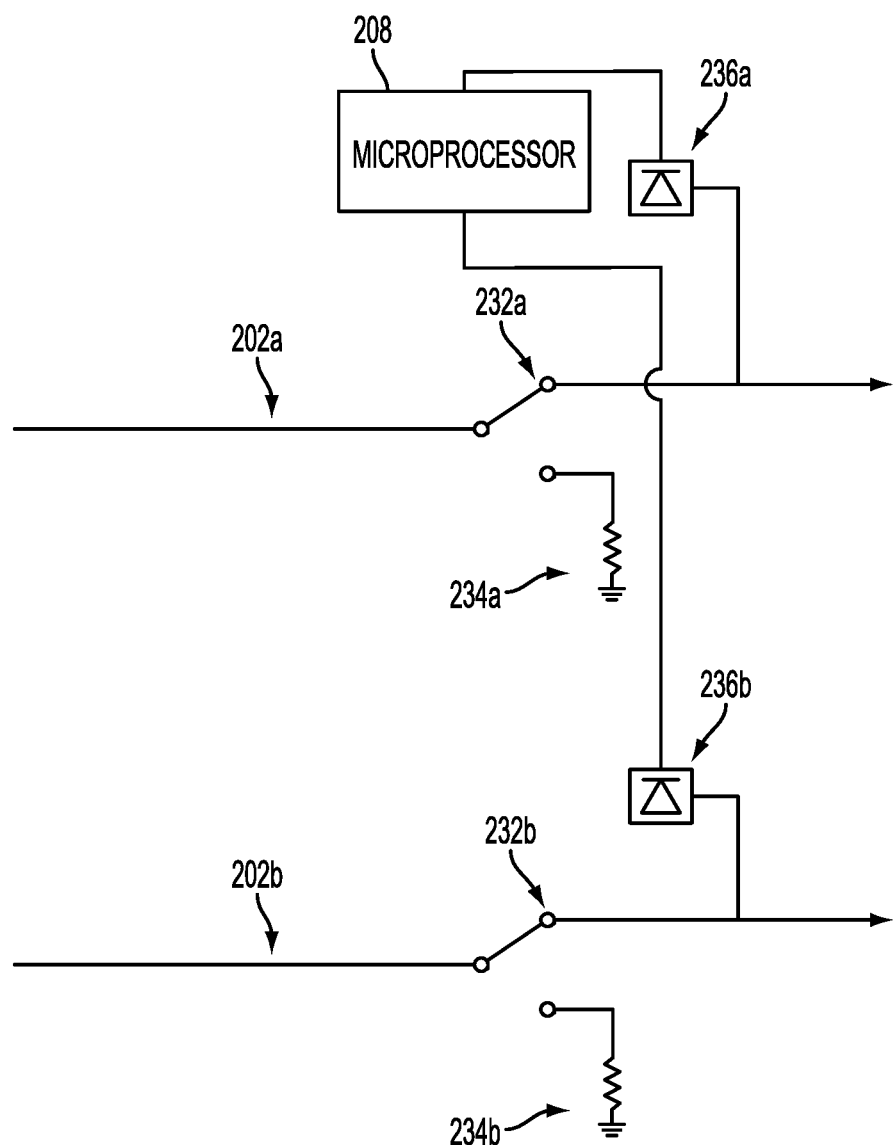
FIG. 6 is a schematic diagram that depicts an example of the automatic load termination module of FIG. 3 according to one aspect of the present disclosure.

FIG. 6 is a schematic diagram that depicts an example of the automatic load termination module 108 of the DAS interface device 104. The automatic load termination module 108 can be used to automatically terminate unused downlink ports to one or more suitable resistive termination loads. An example of a suitable resistive termination load is a load having a resistance of 50 ohms. Automatically terminating unused uplink and downlink ports can reduce errors during installations and reduce costs associated with external loads.

The automatic load termination module 108 can include the microprocessor 208, the switches 232*a*, 232*b*, the resistive termination loads 234*a*, 234*b*, and the power detectors 236*a*, 236*b*. In some aspects, unused RF ports or other ports can be automatically terminated with resistive termination loads in response to a low-frequency cable detection. In one example, the microprocessor 208 can provide one or more low frequency signals or other test signals to one or more of the downlink paths 202*a*, 202*b*. For example, a low frequency signal can be provided via an output port of the microprocessor 208 to an RF port (e.g., the port 238) that is can be communicatively coupled to the microprocessor 208 (e.g., via a direct connection). A non-limiting example of a low frequency signal is a signal having a frequency from 1 kHz to 5 KHz. In another example, the signal generator 218 can provide one or more low frequency signals or other test signals to one or more of the downlink paths 202a, 202b. A non-limiting example of a low frequency signal is a signal having a frequency from 30 kHz to 300 kHz. The power of the low frequency signals as detected by one or more of the power detectors 236a, 236b can be used to detect if a given port of the DAS interface device is connected to another port of a different device (e.g., a master unit of a DAS). One or more of the power detectors 236a, 236b can provide power measurements to the microprocessor 208. The microprocessor 208 can respond to detecting the absence of a connected device at one or more ports by configuring one or more of the switches 232a, 232b to connect one or more of the downlink paths 202a, 202b to one or more of the resistive termination loads 234a, 234b.

In additional or alternative aspects, unused RF ports or other ports can be automatically terminated with resistive termination loads in response to a system configuration tool defining or otherwise identifying the connected ports of the DAS interface device 104. For example, the microprocessor 208 or other processing device can receive a configuration plan for one or more DAS's or access such a configuration plan from a non-transitory computer-readable medium. The microprocessor 208 or other processing device can determine from the configuration plan that a subset of the ports included in the DAS interface device 104 are to be used to connect the DAS interface device 104 to units of a DAS (e.g., the remote units 116, 120). The microprocessor 208 or other processing device can also determine from the configuration plan that one or more ports are not in the specified subset. The microprocessor 208 or other processing device can automatically configure one or more switches or other switches of the DAS interface device 104 to connect the unused ports (i.e., the ports not included in the specified subset) to termination loads.

Figure 7:
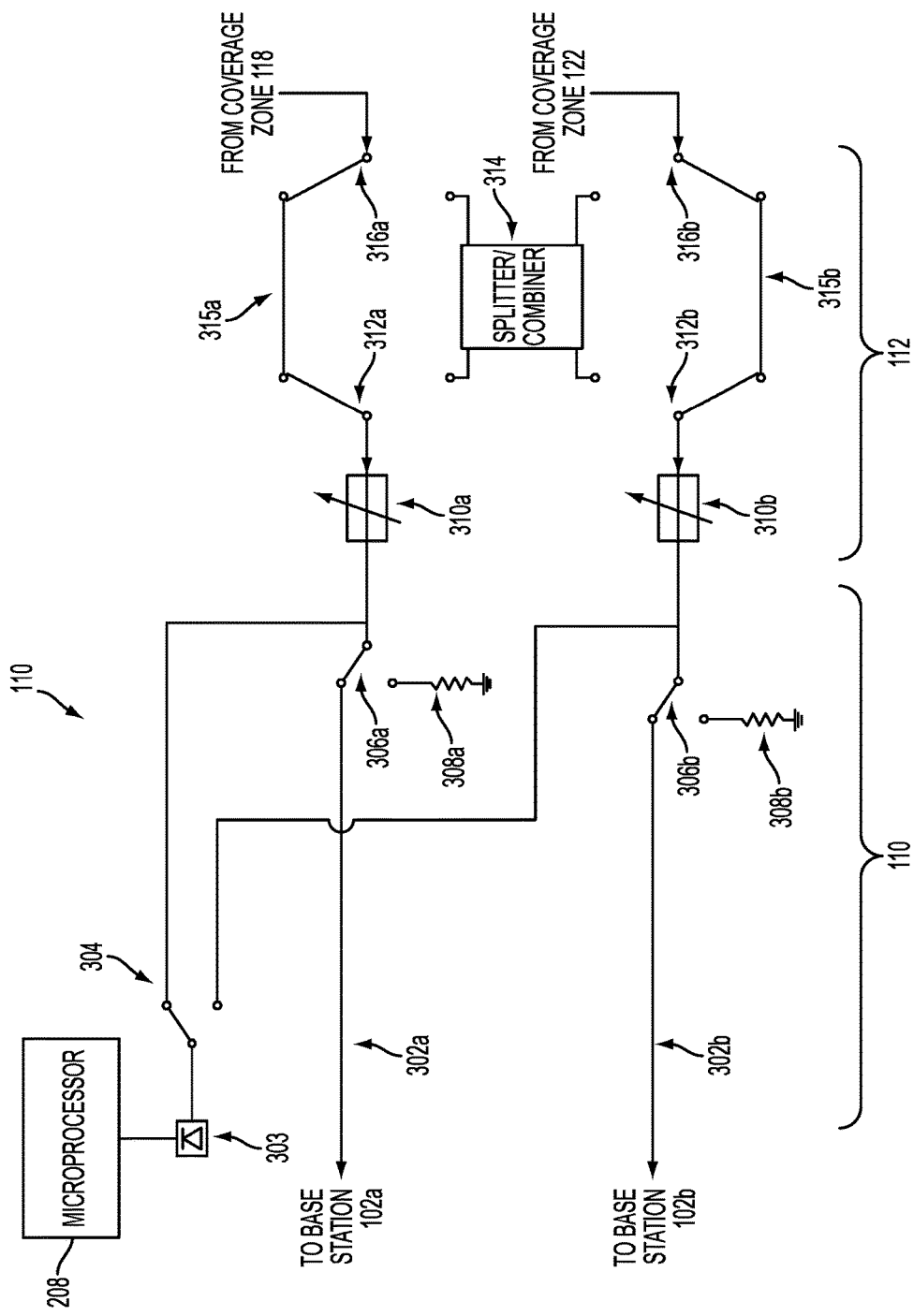
FIG. 7 is a schematic diagram that depicts an example of the uplink noise measurement module and a portion of the hybrid configuration module of FIG. 1 in uplink paths according to one aspect of the present disclosure.

FIG. 7 is a schematic diagram that depicts an example of the uplink noise measurement module 110 and a portion of the hybrid configuration module 112 in the uplink paths 302a, 302b. Uplink signals from one or more of the coverage zones 118, 122 can be provided to one or more of the base stations 102a, 102b via one or more of the uplink paths 302a, 302b.

The uplink noise measurement module 110 can include the microprocessor 208, the power detector 303, and the switch 304. The switch 304 can selectively couple the power detector 303 to an output port of the uplink path 302a or an output port of the uplink path 302b. Coupling the power detector 303 to an output port of an uplink path can allow for measuring the system output noise of a DAS at a point between the DAS and a base station that is communicatively coupled to the DAS. The power detector 303 can be an enhanced channel power detector or other suitable device for selectively measuring the uplink power in the frequency domain. The power detector 303 can provide data to the microprocessor 208 that indicates the uplink power. The microprocessor 208 can determine an output noise level from the measured power. The noise level for the DAS can be automatically adjusted by the microprocessor 208 based on noise criteria for a given base station.

In some aspects, the switch 304 can be controlled using the microprocessor 208. The switch 304 can be coupled to the microprocessor 208 in any suitable manner (e.g., via conductive leads or traces of a printed circuit board).

Determining the output noise level can allow for optimizing or otherwise adjusting the uplink dynamic range of one or more devices in a DAS to which the DAS interface device 104 is communicatively coupled. The uplink dynamic range can be optimized or otherwise adjusted based on the base station. In some aspects, the uplink dynamic range dynamic range can be optimized for cases in which a user of the DAS does not require a low noise rise. In the absence of limitations on the noise rise, a maximum DAS noise can be used and the DAS can be optimized for a preferable dynamic range.

FIG. 7 also depicts one or more components of an automatic load termination module 108. For example, in some aspects, uplink paths 302a, 302b can include switches 306a, 306b for disconnecting output ports from the uplink paths 302a, 302b and connecting the uplink paths 302a, 302b to resistive termination loads 308a, 308b. The switches 306a, 306b can be coupled to the microprocessor 208 in any suitable manner (e.g., via conductive leads or traces of a printed circuit board). The microprocessor 208 can configure the switches 306a, 306b in a manner similar to that described above with respect to FIG. 6. The components of the automatic load termination module 108 depicted in FIG. 6 can be used instead of or in combination with the components of the automatic load termination module 108 depicted in FIG. 7.

FIG. 7 depicts a DAS interface device 104 having two uplink paths 302a, 302b for illustrative purposes. However, other implementations are possible. For example, a DAS interface device 104 can include any number of uplink paths with devices or other components corresponding to the devices or other components depicted in FIG. 7 for uplink paths 302a, 302b.

A portion of the hybrid configuration module 112 in depicted in FIG. 7 includes attenuators 310a, 310b, switches 312a, 312b, a splitter/combiner 314, bypass signal paths 315a, 315b, and switches 316a, 316b. The operations of various components of the hybrid configuration module 112 are described in detail herein with respect to FIG. 8.

Figure 8:
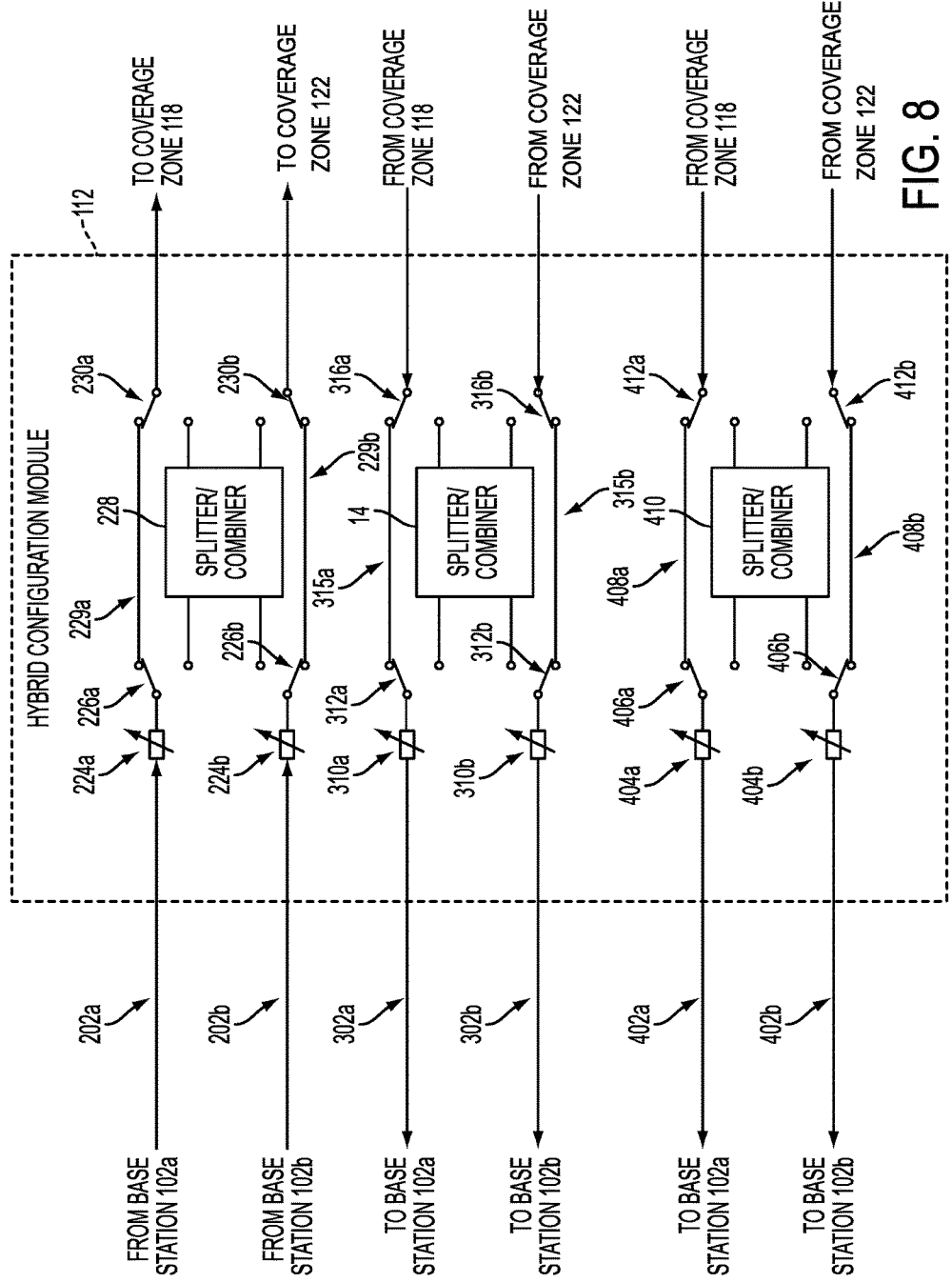
FIG. 8 is a block diagram depicting an example of the hybrid configuration module of FIG. 1 according to one aspect of the present disclosure.

FIG. 8 is a block diagram depicting an example of the hybrid configuration module 112. The hybrid configuration module 112 can include splitters that split or otherwise separate signals for distribution to different coverage zones and combiners that combine signals for distribution to multiple coverage zones. In some aspects, the hybrid configuration module 112 can include or otherwise be implemented as an interface card that can be coupled to the DAS interface device 104.

The implementation of the hybrid configuration module 112 depicted in FIG. 8 includes the splitter/combiner 228 for the downlink paths 202a, 202b. The splitter/combiner 228 can include one or more combiners, one or more attenuators, and one or more splitters. The hybrid configuration module 112 can also include one or more bypass signal paths 229a, 229b that the splitter/combiner 228. For example, one of the bypass signal paths 229a, 229b can allow downlink signals from a base station 102a, 102b to be provided to a single coverage zone without being separated for transmission to different coverage zones or combined with other downlink signals from another base station.

The hybrid configuration module 112 can also include the splitter/combiner 314 for the uplink paths 302a, 302b. The splitter/combiner 314 can include one or more combiners, one or more attenuators, and one or more splitters. The hybrid configuration module 112 can also include one or more bypass signal paths 315a, 315b. One or more bypass signal paths 315a, 315b can allow uplink signals to bypass the splitter/combiner 314.

The hybrid configuration module 112 can also include an additional splitter/combiner 410 for additional uplink paths 402a, 402b to one or more of the base stations 102a, 102b. The uplink paths 402a can be used to provide diversity signals to a receiver diversity port of the base station 102a. The uplink paths 402b can be used to provide diversity signals to a receiver diversity port of the base station 102b. The additional splitter/combiner 410 can be selectively coupled to attenuators 404a, 404b via respective switches 406a, 406b or other suitable switches. The hybrid configuration module 112 can also include one or more bypass signal paths 408a, 408b coupled to respective switches 412a, 412b. One or more of the bypass signal paths 408a, 408b can allow uplink diversity signals or other uplink signals to bypass the splitter/combiner 410.

The hybrid configuration module 112 can be used to select a configuration of the DAS interface device 104 for transmitting downlink signals to one or more coverage zones 118, 122 of one or more DAS's. In one configuration, one or more combiners of the splitter/combiner 228 can combine downlink signals from different base stations 102a, 102b. The combined downlink signals can be provided to multiple coverage zones 118, 122. In another configuration, downlink signals can be split or otherwise separated by one or more splitters of the splitter/combiner 228. In some aspects, the separated downlink signals can be provided to different remote units in a coverage zone to provide MIMO capability in the coverage zone. In additional or alternative aspects, the downlink signals can be separate to provide different sectors to different coverage zones.

The hybrid configuration module 112 can be provide different DAS configurations. For example, a MIMO configuration can be used with two signal paths. One or more splitters can be used for cases in which a sector (e.g., an amount of capacity from a base station) is divided and different portions of the section are provided to different coverage zones of the DAS. One or more combiners can be used for cases in which two or more sectors are to be combined for provision to the same coverage zone of the DAS. A hybrid configuration can be used to combine two or more sectors and the divide the combined sectors for provision to two or more coverage zones.

Figure 9:
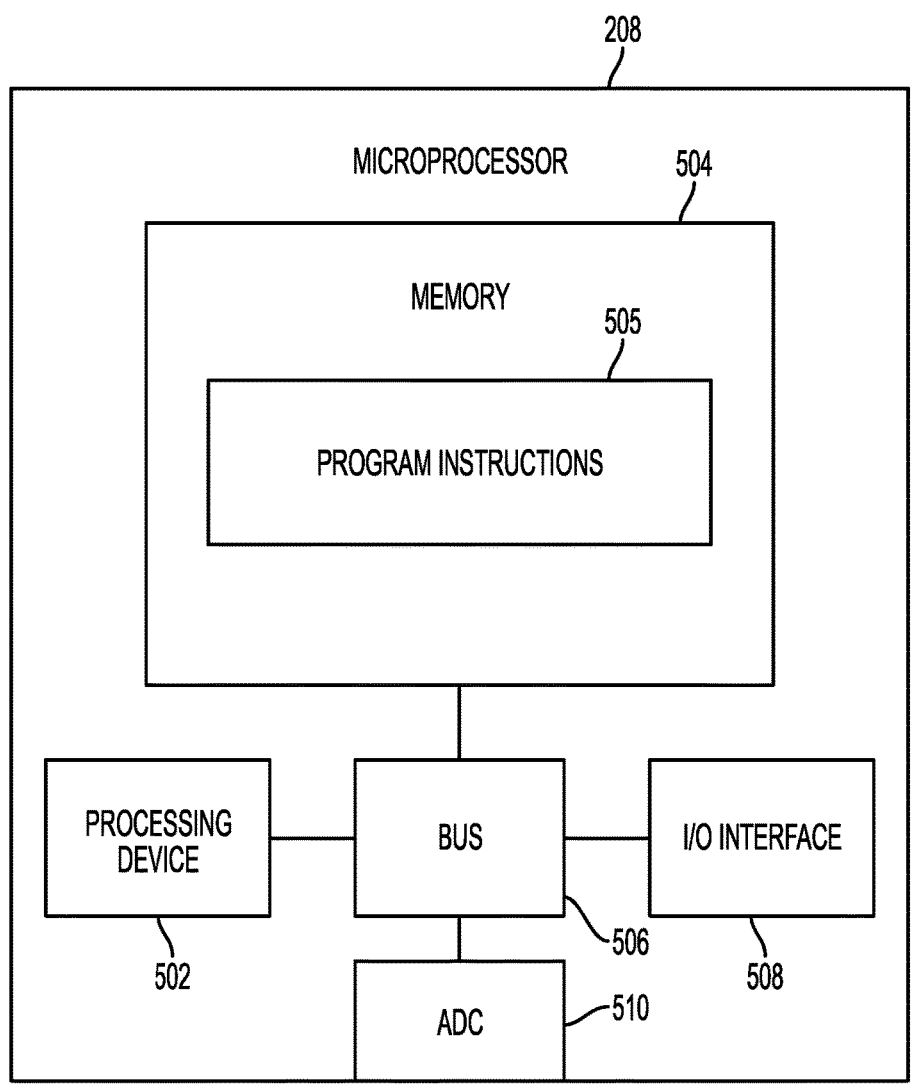
FIG. 9 is a block diagram depicting an example of a microprocessor used in one or more modules of an interface device according to one aspect of the present disclosure.

Any suitable microprocessor 208 can be used to execute algorithms or other operations described with respect to FIGS. 1-8 above. For example, FIG. 9 is a block diagram depicting an example of a microprocessor 208 that can be included in or used by a DAS interface device 104.

The microprocessor 208 can include a processing device 502 that can execute program instructions 505 stored on a computer-readable medium, such as a memory 504, to cause the microprocessor 208 to generate the network schematic. Examples of processing device 502 include a microprocessor, an application-specific integrated circuit ("ASIC"), a field-programmable gate array ("FPGA"), or other suitable processing device. The processing device 502 may include any number of processors, including one.

The microprocessor 208 can also include a bus 506. The bus 506 can communicatively couple components of the microprocessor 208. For example, the processing device 502 can access executable instructions stored in memory 504 via the bus 506. The bus 506 may be any device capable of transferring data between components of the microprocessor 208. The bus 506 can include one device or multiple devices.

The memory 504 may be any non-transitory computer-readable medium capable of tangibly embodying executable instructions and can include electronic, magnetic, or optical devices. Examples of memory 504 include random access memory ("RAM"), read-only memory ("ROM"), magnetic disk, an ASIC, a configured processor, or other storage device. Although FIG. 9 depicts the memory 504 as included in the microprocessor 208, the memory 504 can additionally or alternatively be accessed from a remote location or device by the microprocessor 208.

Program instructions 505 can be stored in memory 504 as executable code. The program instructions 505 can include processor-specific instructions generated by a compiler and/or an interpreter from code written in any suitable computer-programming language, such as C, C++, C#, Visual Basic, Java, Python, Perl, JavaScript, and ActionScript.

In some aspects, the microprocessor 208 can receive inputs through input/output ("I/O") interface 508 and store the inputs in memory 504. The outputs can be provided to a display device 810 via the I/O interface 508. For example, the outputs can be provided via the I/O interface 508 to a display device, another computing device, a printing device, an external storage medium, etc. In other aspects, the I/O interface 508 can be omitted, In some aspects, the microprocessor 208 can also include one or more analog-to-digital converters 510. An analog-to-digital converter 510 can sample a voltage or current at an input of the microprocessor 208 to obtain data from the sampled voltage or current. The sampled data can be provided to the processing device 502 via the bus 506. In other aspects, the microprocessor 208 can be communicatively coupled to an analog-to-digital converter that is external to or otherwise separate from the microprocessor 208. The microprocessor 208 can receive data from an analog-to-digital converter via an I/O interface 508.

This example of a microprocessor 208 is provided to illustrate configurations of certain aspects. Other configurations may of course be utilized.

Figure 10:
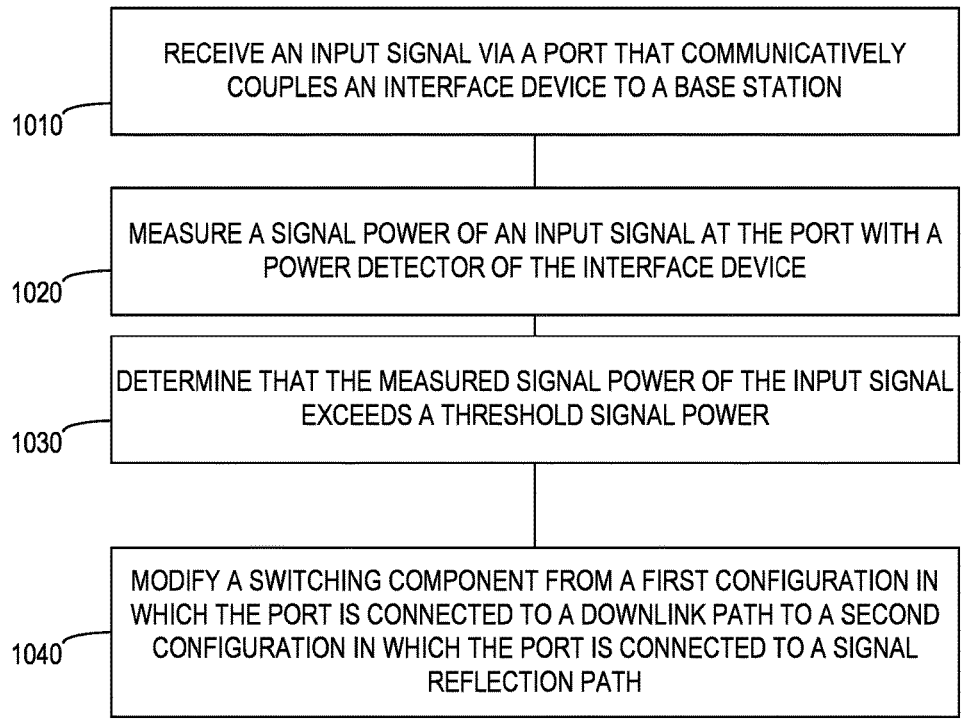
FIG. 10 is a flow chart depicting an example of a process for providing overpower protection using an interface device for a distributed antenna system according to one aspect of the present disclosure.

FIG. 10 is a flow chart depicting an example of a process 1000 for providing overpower protection in a DAS using an interface device 104. The process 1000 is described with respect to one or more of the aspects and examples described above with respect to FIGS. 1-9. Other implementations, however, are possible.

The process 1000 involves receiving an input signal via a port that communicatively couples an interface device to a base station, as depicted in block 1010. For example, an input port 201 of a DAS interface device 104 can be used to receive one or more input signals (e.g., downlink signals) from one or more base stations, as described above with respect to FIG. 2.

The process 1000 also involves measuring a signal power of an input signal at the port with a power detector of the interface device, as depicted in block 1020. For example, a power detector 204 can be used to measure the signal power of the received input signal, as described above with respect to FIGS. 2-4.

The process 1000 also involves determining that the measured signal power of the input signal exceeds a threshold signal power, as depicted in block 1030. For example, a processing device 502 of a microprocessor 208 or other computing device can execute program instructions 505 to determine that the measured signal power of the input signal exceeds a threshold signal power, as described above with respect to FIGS. 2-4 and 9. The threshold signal power can be stored in the memory device 504.

The process 1000 also involves modifying a switching component from a first configuration in which the port is connected to a downlink path to a second configuration in which the port is connected to a signal reflection path, as depicted in block 1040. For example, a processing device 502 of a microprocessor 208 or other computing device can execute program instructions 505 to modify a switching component 210 from a first configuration in which the port is connected to a downlink path 202 to a second configuration in which the port is connected to a signal reflection path 212, as described above with respect to FIGS. 2-4 and 9. The threshold signal power can be stored in the memory device 504.

In additional or alternative aspects, the process 1000 can involve reconnecting the downlink path 202 to the port 201. For example, a processing device 502 of a microprocessor 208 or other computing device can execute program instructions 505 to determine that an additional signal power of an additional input signal measured at the port 201 by the power detector 204 is less than or equal to the threshold signal power. The processing device 502 can modify the configuration of the switching component 210 from the second configuration to the first configuration in response to determining that the additional measured signal power is less than or equal to the threshold signal power.

Figure 11:
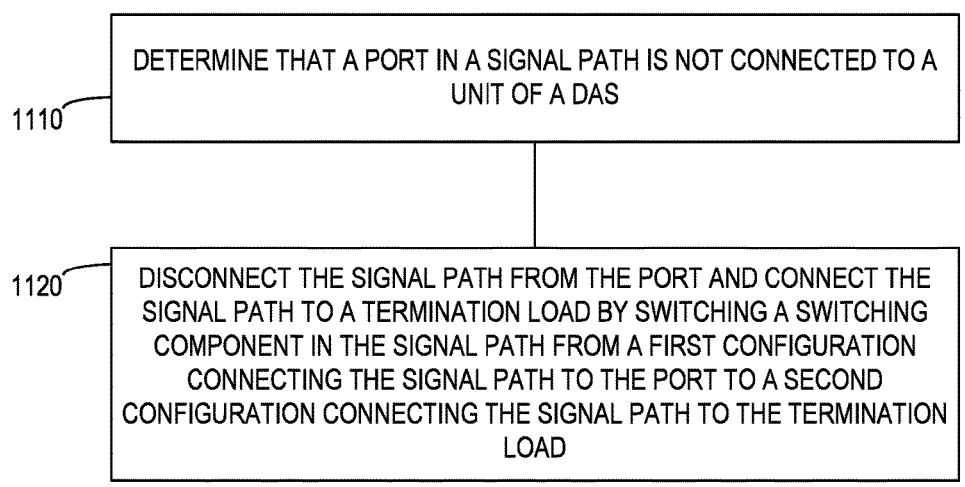
FIG. 11 is a flow chart depicting an example of a process for providing automatic load termination using an interface device for a distributed antenna system according to one aspect of the present disclosure.

FIG. 11 is a flow chart depicting an example of a process 1100 for providing automatic load termination in a DAS using an interface device 104. The process 1100 is described with respect to one or more of the aspects and examples described above with respect to FIGS. 1-9. Other implementations, however, are possible.

The process 1100 involves determining that a port in a signal path is not connected to a unit of a DAS, as depicted in block 1110. For example, a port 238 of a DAS interface device 104 may be in a disconnected state in which the port 238 is not connected to a remote unit or other DAS unit, as described above with respect to FIG. 2.

The process 1100 also involves disconnecting the signal path from the port and connecting the signal path to a termination load by switching a switching component in the signal path from a first configuration connecting the signal path to the port to a second configuration connecting the signal path to the termination load, as depicted in block 1120. For example, a processing device 502 of a microprocessor 208 or other computing device can execute program instructions 505 to modify a switching component 232 from a first configuration in which the downlink path 202 is connected to a port 238 to a second configuration in which the downlink path 202 is connected to a termination load 234, as described above with respect to FIGS. 2, 6, and 9. The operation depicted in block 1120 can be performed in any suitable manner. For example, the operation depicted in block 1120 can involve one or more of the operations described above with respect to FIGS. 2 and 6.

While the present subject matter has been described in detail with respect to specific aspects and features thereof, it will be appreciated that those skilled in the art, upon attaining an understanding of the foregoing may readily produce alterations to, variations of, and equivalents to such aspects and features. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. An interface device for a distributed antenna system, the interface device comprising:
    a port configured to communicatively couple the interface device to a base station;
    a switching component coupled to the port, wherein the switching component is switchable from a first configuration to a second configuration, the first configuration connecting the port to a downlink path from the interface device to the distributed antenna system, the second configuration connecting the port to a load;
    a first power detector communicatively coupled to the port and configured to measure a signal power of an input signal provided via the port;
    at least a second power detector communicatively coupled to the downlink path and configured to measure a signal power of a gain-adjusted signal traversing the downlink path; and
    at least one switchable hybrid module in the downlink path.

2. The interface device of claim 1, wherein the at least one switchable hybrid module is configured to selectively combine downlink signals from multiple base stations.

3. The interface device of claim 1, wherein the at least one switchable hybrid module has a first configuration and a second configuration, wherein the first configuration of the at least one switchable hybrid module comprises the at least one switchable hybrid module being configured to combine downlink signals from multiple base stations and providing the combined downlink signal to the distributed antenna system, wherein the second configuration of the at least one switchable hybrid module comprises the at least one switchable hybrid module being configured to separate downlink signals for transmission using a multiple-input/multiple-output protocol by the distributed antenna system.

4. The interface device of claim 1, wherein the interface device is configured to switch the switching component from the first configuration to the second configuration in response to the signal power of the input signal exceeds a threshold signal power.

5. The interface device of claim 4, wherein the threshold signal power is selectable by a user.

6. The interface device of claim 1, further comprising a processing device communicatively coupled to the switching component, wherein the processing device is configured to switch the switching component from the first configuration to the second configuration, wherein the processing device is communicatively coupled to the first power detector, wherein the processing device is configured to determine whether the measured signal power of the input signal exceeds a threshold signal power and switch the switching component from the first configuration to the second configuration in response to determining that the measured signal power exceeds the threshold signal power.

7. The interface device of claim 1, wherein the interface device is coupled to a master unit of the distributed antenna system.

8. The interface device of claim 1, wherein the load has an impedance sufficient to reflect at least a portion of the input signal.

9. The interface device of claim 1, wherein the load comprises a termination load.

10. The interface device of claim 1, wherein the interface device is configured to provide overpower protection for one or more of the interface device or a unit of the distributed antenna system coupled to the interface device by switching the switching component from the first configuration to the second configuration.

11. A method comprising:
    receiving an input signal via a port communicatively coupling an interface device to a base station;
    selectively switching a switching component between a first configuration and a second configuration with a processing device, wherein the first configuration comprises connecting the port to a downlink path from the interface device to a unit of a distributed antenna system, wherein the second configuration comprises connecting the port to a load;

measuring a signal power of the input signal at the port with a first power detector of the interface device communicatively coupled to the port;

measuring a signal power of a gain-adjusted signal traversing the downlink path of the interface device with a second power detector of the interface device communicatively coupled to the downlink path; and selectively switching at least one switchable hybrid module in the downlink path of the interface device.

12. The method of claim 11, wherein selectively switching the at least one switchable hybrid module in the downlink path comprises selectively switching at least one switchable hybrid module between a first configuration and a second configuration, wherein the first configuration of the at least one switchable hybrid module comprises combining downlink signals from multiple base stations and providing the combined downlink signal to the distributed antenna system, wherein the second configuration of the at least one switchable hybrid module comprises separating downlink signals for transmission using a multiple-input/multiple-output protocol by the distributed antenna system.

13. The method of claim 11, further comprising:
determining whether the measured signal power of the input signal exceeds a threshold signal power; and
selectively switching the switching component from the first configuration to the second configuration is performed in response to determining that the measured signal power exceeds the threshold signal power.

14. The method of claim 11, wherein the load has an impedance sufficient to reflect at least a portion of the input signal.

15. The method of claim 11, wherein the load comprises a termination load.

16. A program product tangibly stored on a non-transitory computer-readable storage medium comprising instructions which, when executed by at least one programmable processor, cause the at least one programmable processor to:

selectively switch a switching component between a first configuration and a second configuration, wherein the switching component is configured to connect a port of an interface device to a downlink path from the interface device to a unit of the distributed antenna system in the first configuration, wherein the switching component is configured to connect the port to a load in the second configuration, wherein the port communicatively couples the interface device to a base station;

measure a signal power of an input signal received at the port of the interface device with a first power detector of the interface device communicatively coupled to the port;

measure a signal power of a gain-adjusted signal traversing the downlink path of the interface device with a second power detector of the interface device communicatively coupled to the downlink path; and selectively switch at least one switchable hybrid module in the downlink path of the interface device.

17. The program product of claim 16, further comprising instructions which, when executed by at least one programmable processor, cause the at least one programmable processor to:
detect an overpower condition based on the measured signal power of the input signal; and
selectively switch the switching component from the first configuration to the second configuration in response to detecting the overpower condition.

18. The program product of claim 16, wherein the instructions cause the at least one programmable processor to selectively switch the at least one switchable hybrid module in the downlink path of the interface device between a first configuration and a second configuration, wherein the at least one switchable hybrid module is configured to combine downlink signals from multiple base stations and provide the combined downlink signal to the distributed antenna system in the first configuration, wherein the at least one switchable hybrid module is configured to separate downlink signals for transmission using a multiple-input/multiple-output protocol by the distributed antenna system in the second configuration.

19. The program product of claim 16, wherein the load has an impedance sufficient to reflect at least a portion of the input signal.

20. The program product of claim 16, wherein the load comprises a termination load.

* * * * *